Jan. 22, 1957     E. F. PETERSON     2,778,230

POSITIVE DRIVE VIBRATORY MECHANISM

Filed Aug. 9, 1952     4 Sheets-Sheet 1

INVENTOR.
Edwin F. Peterson
BY
Eberhard E. Atolley
Atty.

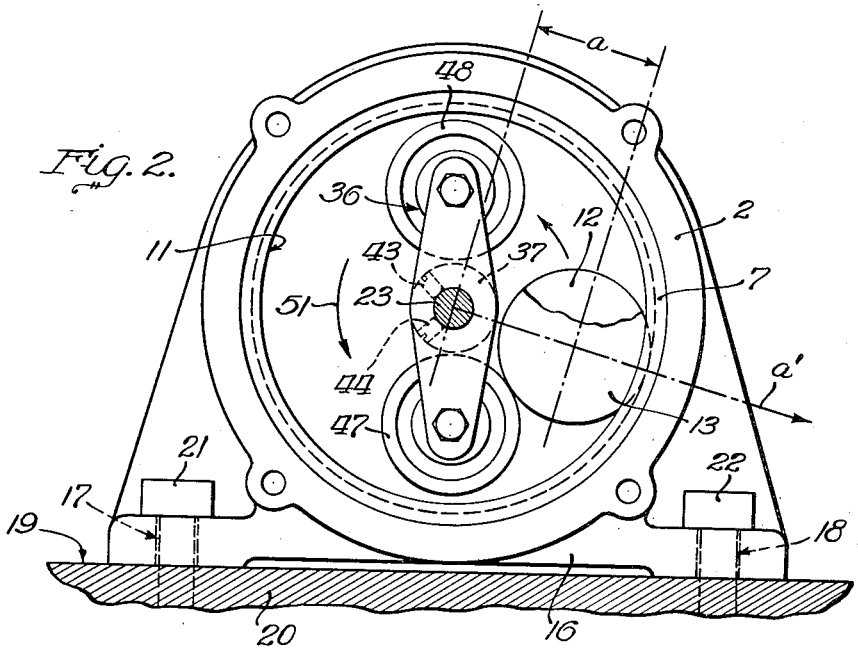
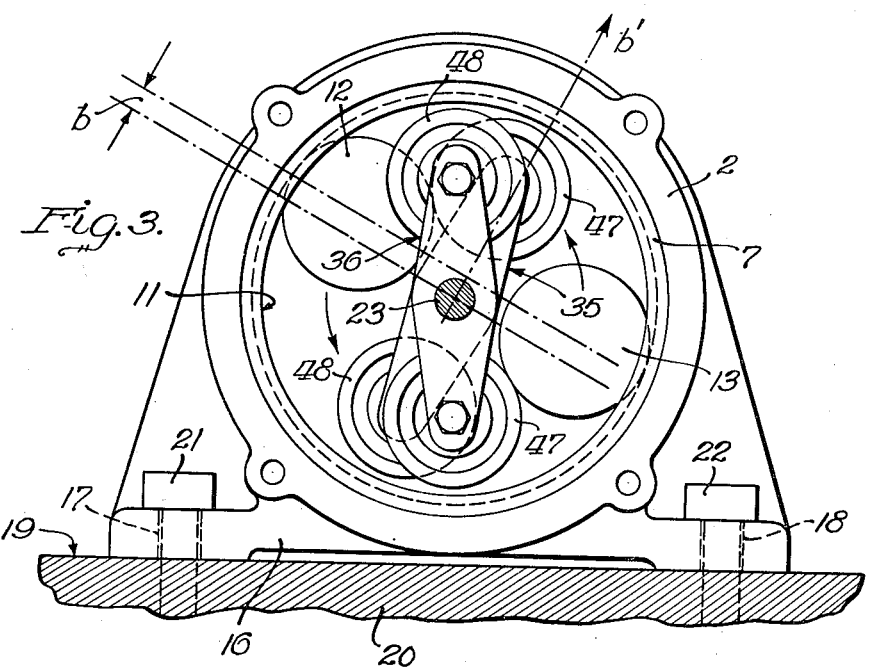

Jan. 22, 1957 E. F. PETERSON 2,778,230
POSITIVE DRIVE VIBRATORY MECHANISM
Filed Aug. 9, 1952 4 Sheets-Sheet 3
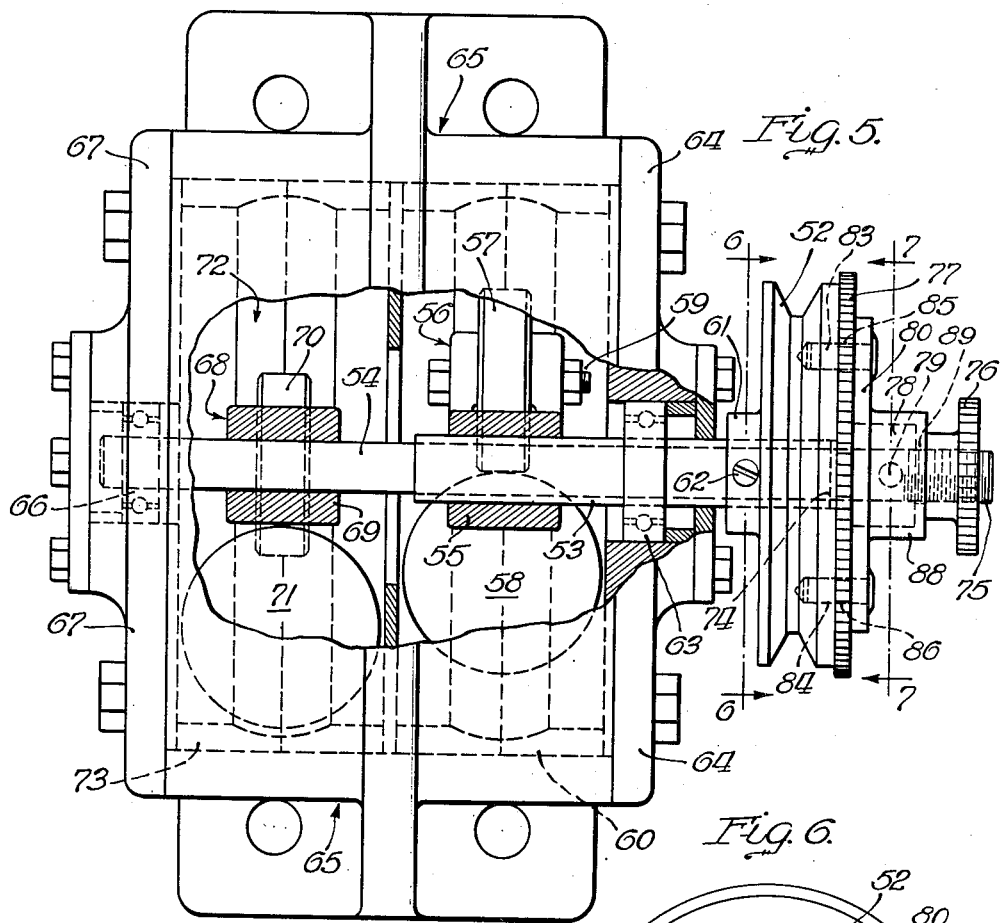
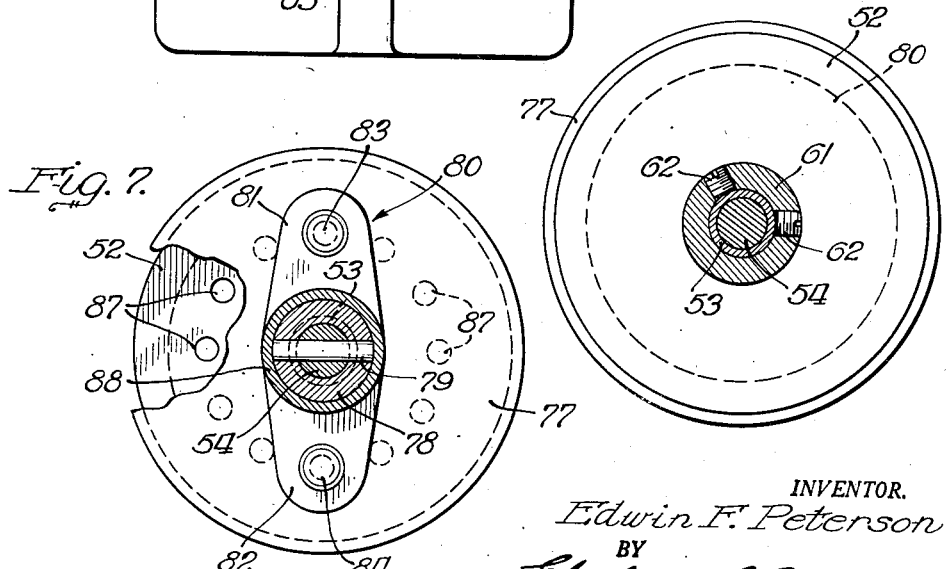
INVENTOR.
Edwin F. Peterson
BY
Eberhard E. Whitley
Atty.

INVENTOR.
Edwin F. Peterson

United States Patent Office 2,778,230
Patented Jan. 22, 1957

2,778,230

POSITIVE DRIVE VIBRATORY MECHANISM

Edwin F. Peterson, Kewanee, Ill.

Application August 9, 1952, Serial No. 303,532

16 Claims. (Cl. 74—61)

The present invention relates to a vibratory mechanism of the type employed for attachment with a piece of equipment or any other means, such equipment or means being enhanced in its operation through the introduction of vibration transmitted from the vibratory mechanism.

This invention relates to certain improvements over such vibratory units of the character shown and described in my Patent No. 2,480,603, issued August 30, 1949. In the patented device, the primary action for introducing vibrations consists of the unidirectional high velocity operation of a rolling element within a circular casing. The actuating means for operating the device of the patent comprises an air system which is directed to propel the ball about its raceway within the casing at selected speeds, the device incorporating suitable air exhaust means to promote the continuous operation of the device.

It is one of the objects of the present invention to provide positively operated mechanical means for actuating a rolling element within a casing along a predescribed trackway with the rolling element following a path in off center relation with respect to the center of the casing per se.

It is another object of the present invention to provide a vibratory mechanism utilizing one or more rolling elements with positive means for driving such elements above the confines of the casing and in offset relation with respect to the normal axis of the casing.

It is a further object of the present invention to provide at least two rolling elements and to introduce positively driven mechanism having direct contact with each of said rolling elements per se and to introduce means for bodily actuating both of such rolling units together in concerted radial positions about the casing and to adjust the driving mechanisms to obtain an angular disposition of the balls within the casing and in offset relation with respect to the axis thereof to obtain a different centrifugal force relationship in contrast to the concerted abreast action of the two balls when disposed in the same radial plane.

Another object of the present invention comprises the use of at least two rotating elements arranged for actuation about the walls of a casing and in a given respect to the axis of the casing and to provide a drive mechanism resulting in individual contact with each of the two balls respectively and arranged to definitely and positively drive one ball in the opposite direction with respect to the other. Through this action it is evident that when both balls meet at the same side of the casing and in a given radial plane that a maximum centrifugal force will be transmitted to the casing and the mechanism thereof, and that when the same balls are disposed in 180° relationship with respect to their axis of rotation that each of the balls will neutralize the other to instantaneously produce a nullification of the centrifugal forces created by the balls. In driving the balls or rolling elements in opposite directions at high speeds, the entire vibratory mechanism is subjected to powerful vibration and by providing suitable attaching means for this mechanism to rigidly secure the same to a piece of equipment or some other means, it is possible to transmit this tremendous vibratory action into the attached means to vibrate such means for producing given results as desired.

Other objects of the present invention relate to the mechanisms employed for offsetting the rolling elements in units of this kind using at least two rolling units whereby it is possible to vary the vibrational forces generated and transmitted to the device to obtain a certain amplitude of vibratory action according to the conditions and requirements to which the vibratory mechanism is assigned.

Other objects and advantages relating to the positive drive vibratory mechanism of the present invention shall hereinafter appear in the following detailed description having reference to the accompanying drawings forming a part of the specification.

In the drawings:

Fig. 2 is an end elevational view of the vibratory mechanism illustrated in Fig. 1 and substantially as viewed along the line 2—2 in Fig. 1 to show the interior of the casing and the mechanism contained therein and with the cover of the adjacent side removed;

Fig. 3 is a view substantially similar to Fig. 2, but illustrating the actuating mechanism of the vibratory device in another adjusted position to obtain a different centrifugal vibratory action;

Fig. 5 is a plan view of the vibratory mechanism of the type illustrated in Fig. 1 and incorporating a means for shifting the radial positions of the two balls with respect to each other within the casing, this modified construction further contemplating a structure for changing such ball positions which is located outside of the casing proper; parts of the casing being broken away and in section;

Fig. 6 is a transverse, cross sectional view of the Fig. 5 device substantially as viewed along the line 6—6 in Fig. 5;

Fig. 7 is another transverse, cross sectional view substantially as seen along the line 7—7 in Fig. 5.

Figure 1:
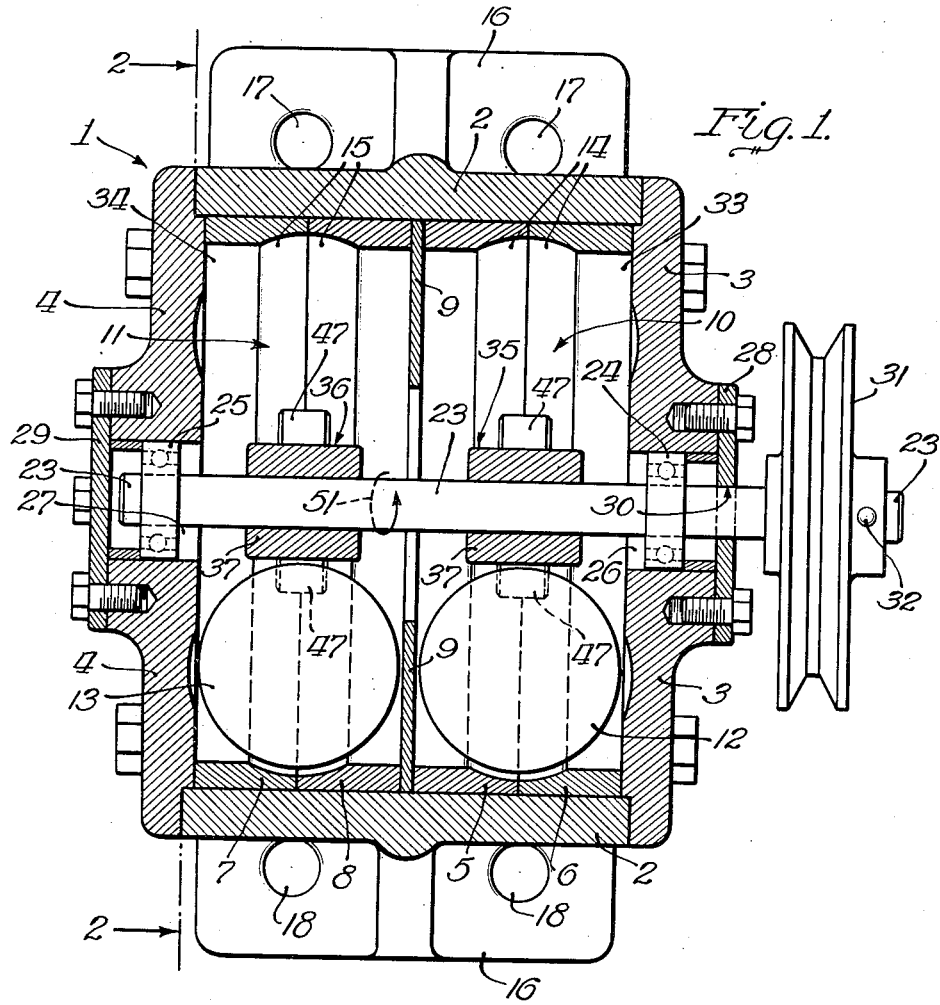
Fig. 1 is a plan sectional view of a positively driven vibratory mechanism of the present invention as the same appears in the axial plane of the driving unit thereof.
Figure 4:
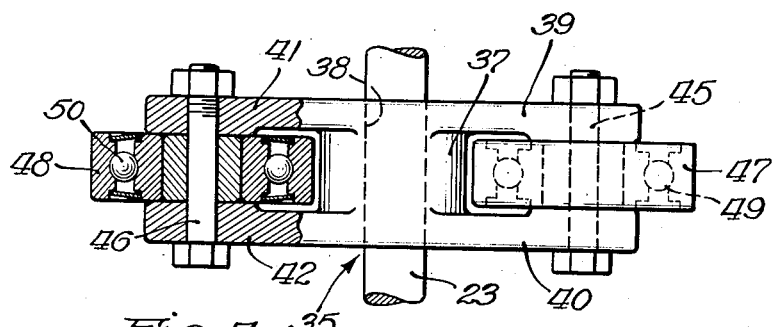
Fig. 4 is a side elevational view of one of the actuating units employed for moving the rolling elements, this view including certain parts broken away and in section to further illustrate details of construction thereof.

Referring to Figs. 1 to 4 inclusive, the vibratory mechanism is constructed with a casing 1 comprising an annular wall 2 and end covers 3 and 4 that are suitably secured thereto, the annular wall being lined with pairs of cooperative hardened steel raceways 5—6 and 7—8 separated by an annular divider 9 so as to form two trackways 10 and 11 within the housing 1. A pair of rolling elements such as the balls 12 and 13 are confined within the housing and rotate within the complementary concave sections 14 and 15 of the trackways 10 and 11. The casing 1 is also provided with a suitable base 16 having openings 17 and 18 whereby the casing 1 may be secured to the surface 19 of a piece of equipment 20 by means of suitable bolts such as 21 and 22 as best shown in Figs. 2 and 3.

Referring more specifically to Fig. 1, the ball actuating means comprises in general an operating shaft 23 that is rotatably carried in roller bearings 24 and 25 that are suitably mounted within the recess portions 26 and 27 of the covers 3 and 4. Closure caps 28 and 29 seal the bearing openings 26 and 27 with the cap 28 having an aperture 30 therein to permit the shaft 23 to extend outwardly of the casing 1 to support a drive pulley 31 suitably secured thereto as by means of a pin 32 as shown in Fig. 1.

From the above description of the casing 1, it will be seen that the same is divided into two compartments generally designated as 33 and 34 as defined by the trackways 10 and 11 in their annular positions between the covers 3 and 4 and as separated by the divider 9. Each of the chambers 33 and 34 contain actuating units 35 and 36 that are fixedly secured to the drive shaft 23 substantially coincident with the median planes of the chambers 33 and 34 which also places the actuating units centrally of the raceways 10 and 11. The actuating units are identical and as better shown in Fig. 4, consist of a central hub 37 containing a bore 38 for the reception of the operating shaft 23, with the hub 37 having pairs of diametrically disposed arms 39—40 and 41—42. As shown in Fig. 2, a pair of angularly spaced set screws 43 and 44 are best employed for securing the hub 37 of the actuating unit to the shaft 23.

Referring again to Fig. 4, each pair of arms includes a supporting bolt 45 and 46 respectively to support actuating wheels 47 and 48 which are constructed with anti-friction roller bearing means 49 and 50 as illustrated whereby to reduce the rotative frictional factors of these wheels and their connection with the operating unit to a minimum. The units 35 and 36 are identical so that the same reference characters have been applied to each in the respective figures of the drawings.

In Figs. 1 and 2, the rolling elements comprising the balls 12 and 13 are carried abreast on the same radial plane with the actuating units 35 and 36 also disposed in alignment with each of their respective actuating wheels 47 and 48 positioned as best illustrated in Fig. 2. In this relationship, the balls 12 and 13 occupy an offset distance $a$ in Fig. 2 with respect to the axial point of rotation of the drive shaft 23. Furthermore, a centrifugal force acting generally in the direction of the radial dot and dash line $a'$ will be introduced into the device to create a vibratory action that is a product of the sum of the weights of the two revolving elements comprising the balls 12 and 13. By driving the shaft 23 through suitable belt means over the pulley 31 at a selected speed, it is possible to produce a very heavy and fast acting vibratory action with this device which can be readily transmitted through the base 16 to the piece of equipment 20.

As shown in Fig. 3, it is possible to vary the angular relationships between the two actuating units 35 and 36 whereby the balls 12 and 13 are offset the distance $b$ as illustrated in Fig. 3 and whereby the sum of the composite ball weights will create a radial force substantially directed as indicated by the dot and dash line $b'$. With the arrangement illustrated in Fig. 3, which comprises an assembly wherein the set screws 43 and 44 on one of the operating units have been loosened and reset to position such unit in the angular relationship illustrated in Fig. 3, it is possible to create a vibratory action of less intensity than the action which is created through the maximum condition of ball concentration illustrated in Fig. 2. This illustrates the flexibility of use of this vibratory mechanism and also the power means for operating such a unit by positively rotating and driving the rolling elements in a given controlled relationship with respect to each other and within the casing which must absorb the centrifugal force and transmit the same to an attached unit or device.

It should also be noted that each of the operating units 35 and 36 are made with two sets of operating wheels 47 and 48 and with the identical arm construction to each side of the center line of the bore 38 that receives the shaft 23. This particular arrangement has been created for the purpose of nullifying the centrifugal action of the driving parts within the casing and also to provide an auxiliary drive which can be used after the vibratory device has been in operation for a considerable time. As a matter of explanation, the device of the present invention may be used with the rotation induced into the casing by the drive shaft 23 being operated in the direction of the arrows 51, Figs. 1 and 2. Should this direction of operation become impaired through wear upon the actuating wheel 47 and the bearings thereof or through wear upon the surface of the wheel 47, it is then equally possible to drive the same unit in the opposite direction bringing the unused wheel 48 into action to oppositely contact the ball or rolling element for driving the same in the other direction. This greatly enhances the useful life of this vibratory mechanism before replacement or repairs are required.

Referring now to Figs. 5, 6 and 7, a modified form is here portrayed wherein it is possible to obtain different angular relationships between the driving units 35 and 36 through the addition of adjustable means located outside of the casing carrying the vibratory rolling elements. As shown in Fig. 5, a pulley 52 is mounted upon a sleeve or hollow shaft 53 that is rotatably carried upon a shaft 54 with the sleeve shaft 53 being suitably connected with a hub 55 of an actuating element 56 that carries the actuating wheels 57 for rotating or driving a ball 58 within the chamber 59 and upon the trackway 60 therein. The pulley 52 as shown in Fig. 6 includes the hub 61 having a pair of set screws 62 for securing the same to the sleeve shaft 53.

As best seen in Fig. 5, the sleeve shaft 53 is carried by a bearing 63 in the cover 64 of the housing 65. The casing end of the shaft 54 is also mounted within the bearing 66 supported within the cover 67 of the casing 65. The second actuating unit 68 has a hub 69 secured to the shaft 54 to carry the actuating wheels 70 for engaging and propelling the ball 71 about the chamber 72 and about the raceway 73 therein.

The shaft 54 extends through the sleeve shaft 53, the latter terminating at 74, with shaft 54 having a threaded end 75 to receive a knurled hand nut 76 thereon. A knurled edge disc 77 is connected with a hub 78 which is keyed by means of a pin 79 to the shaft 54 so that the disc 77 must necessarily rotate with the shaft 54.

A driving element 80 is sandwiched between the knurled hand nut 76 and the disc 77 and comprises a pair of arms 81 and 82 each carrying driving pins 83 and 84 which extend through openings 85 and 86 in the disc 77 for entry into pairs of diametrically aligned openings 87 in the face of the pulley 52. The driving element 80 also is provided with a hollow hub 88 which has an aperture 89 to fit over the shaft 54 with the hub 88 being disposed about the hub 78 of the disc 77.

By tightening up the knurled hand nut 76 against the adjacent radial portion of the hub 88, it is possible to maintain the driving element 80 in the position illustrated in Fig. 5 with the driving pins 83 and 84 seating within openings 87 in the pulley wheel 52. In the operation of the device which consists of driving the pulley 52 through a suitable power belt, both of the shafts comprising the sleeve shaft 53 and shaft 54 are driven together as a unit to bodily rotate the actuating units 56 and 68 to drive the balls 58 and 71 about the casing by means of the wheels 57 and 70.

If it becomes desirable to change the angular relationships between the two operating units 56 and 68, the knurled hand nut 76 may be backed away on the threaded end 75 of the shaft 54 to permit the pins 83 and 84 to be laterally removed from within corresponding openings 87 in the pulley 52, and by holding the pulley wheel 52 and grasping the knurled edge of the disc 77, it is possible to angularly shift the pins 83 and 84 into another set of radially aligned openings 87 in the pulley 52. This particular operation will shift one of the actuators 56 in respect to the other actuator 68 to place the operating wheels 57 and 70 in a different operative radial position to adjust the centrifugal action of the rolling elements comprising the balls 58 and 71. This will produce a centrifugal action of greater or lesser intensity commensurate with the particular setting employed in connection with the pulley 52 and the associated mechanisms described for changing the setting of the units. Obviously, if the setting has been made, the operating drive member 80 is again fixed into driving position by tightening up the knurled hand nut 76 to place the parts in their cooperative relationship as illustrated in Fig. 5.

Figure 8:
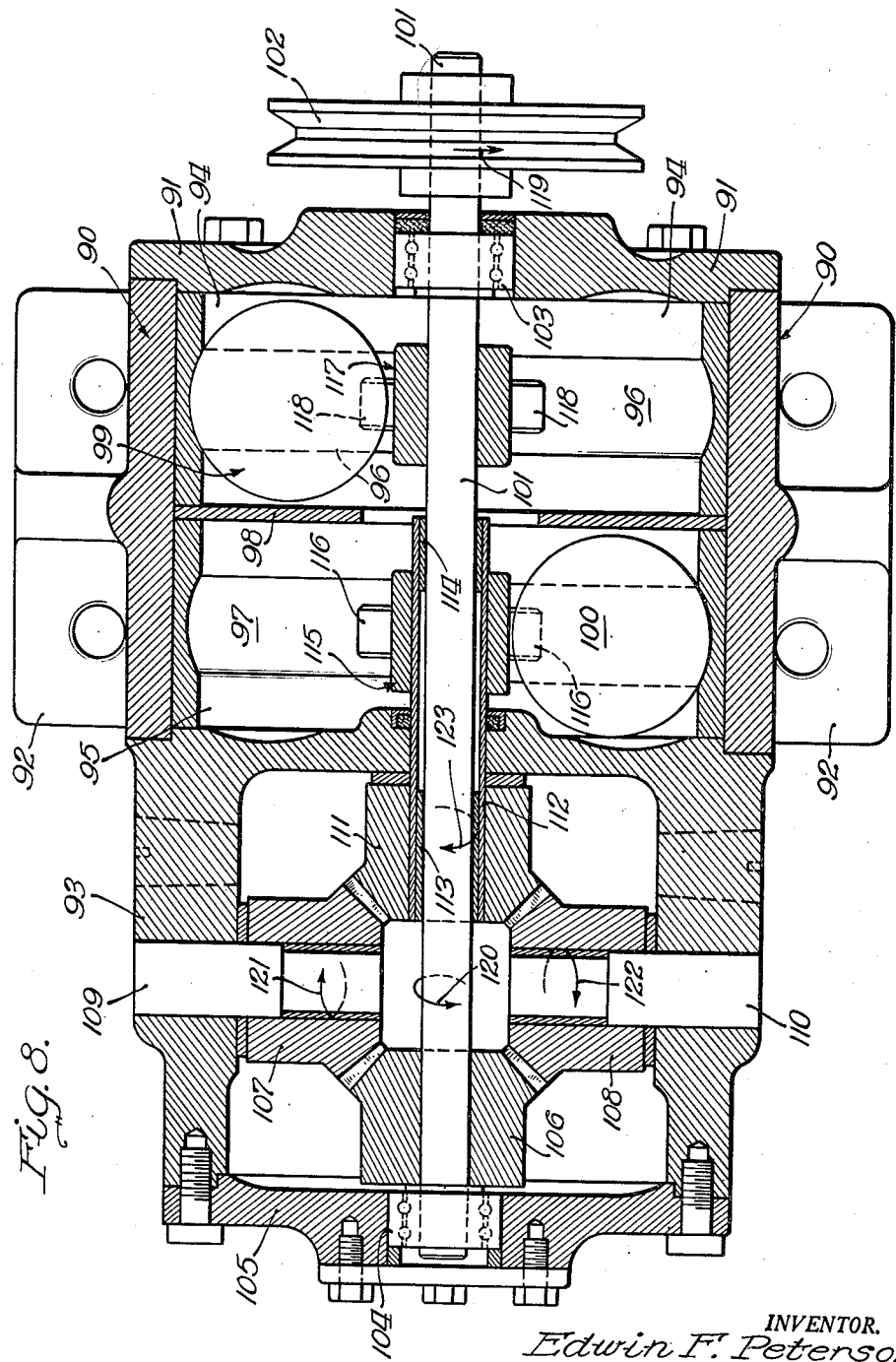
Fig. 8 is a plan sectional view through the axial portion of a vibratory mechanism showing a further modified construction of drive means whereby the two rolling elements are driven in opposite relation with respect to each other.

In the particular forms described, it should be noted that both of the actuating elements or rollers are driven in the same direction by the positively operated drive means. The Fig. 8 construction comprises a modified arrangement wherein the rolling elements or balls are driven oppositely within the casing to introduce a centrifugal action which ranges from 0 to a maximum value of force as created by the composite sum of the two balls simultaneously acting at one point within the casing and according to the particular offset arrangement as shown in Fig. 8.

This modified construction employs a circular casing 90 having a cover 91 and a securing base or bracket 92 with the opposite end of the casing 90 being closed by a gear box 93 forming an enclosed unit for housing certain of the operative and moving units of the present construction.

The casing 90 includes two chambers 94 and 95 with annular hardened steel trackways 96 and 97 separated by an annular partition 98 with a pair of balls 99 and 100 operating in each of the chambers 94 and 95 about the axial center of the casing 90.

The drive in this particular arrangement uses a main drive shaft 101 which is suitably rotated by means of a belt operating upon a pulley 102 that is secured to the shaft 101. The shaft 101 is carried by bearings 103 and 104, the former being mounted in the cover 91 and the latter being supported within a cover 105 that closes the gear box 93.

The far end of the shaft 101 away from the pulley 102 traverses the gear box 93 and is secured and connected with a miter gear 106 which is utilized to drive the miter gears 107 and 108 that are mounted upon suitable stub shafts 109 and 110 supported by the gear box 93. A fourth miter gear 111 is suitably secured to a sleeve shaft 112 that rotates upon sleeve bearings 113 and 114 interposed between the sleeve shaft 112 and 101. Sleeve shaft 112 extends along the shaft 101 into the casing chamber 95, and an actuating unit 115 is secured to the sleeve shaft 112 and carries actuating wheels 116 for moving and impelling the ball 100 about the trackway 97 within the chamber 95. A similar actuating unit 117 is secured to the shaft 101 and carries operating wheels 118 for actuating and impelling the ball 99 about the trackway 96 within the chamber 94.

With this arrangement, it is possible to drive the pulley 102 in the direction of the arrow 119 which will revolve the shaft 101 in the direction of the arrow 120, as shown in the gear box 93, to rotate the miter gear 106 in the same direction. This rotative action will rotate the miter gears 107 and 108 in opposite directions as indicated by the arrows 121 and 122, and the drive from the miter gears 107 and 108 will be transmitted to the miter gear 111 to rotate the latter gear and the connected sleeve shaft 112 in the direction indicated by the arrow 123 which is directly opposite to the rotation of the shaft 101.

The result of this particular arrangement is to drive the actuating unit 117 in the opposite direction from the actuating unit 115, thus also driving the rolling elements comprising the balls 99 and 100 in opposite directions about the casing 90, thereby producing a terrific vibratory action through a positive drive means causing a continuous impelling or rolling of the centrifugal force inducing units through smooth rotational action that entirely eliminates any pounding or noisy action of the type generally found in reciprocatory vibratory devices that have been so prevalently used in the past.

In the Fig. 8 construction it is also possible to change the angular relationships between the two actauting units 117 and 115 by changing the angular relationship between the miter gears 106, 107, 108 and 111. Under normal conditions of operation, such changes will not be necessary unless certain conditions of operation warrant a displacement in the angularity between the operating units 115 and 117 for oppositely actuating the balls 99 and 100 in this changed condition. Although the changed angular relationships between the two operating units will still induce an off center centrifugal vibratory force ranging from 0 to a maximum, it is, however, possible to change the point of application of the maximum force with respect to the casing by changing the angular relationship between the driving elements that impel the rolling units.

The foregoing specific descriptions relate to disclosed preferred and modified constructions of vibratory mechanism of the present invention. Certain changes in the exact shapes of the parts and in the combinations shown and described are contemplated without departing from the fundamental concept of this invention. All such modifications and changes shall, however, be governed by the breadth and scope of the appended claims as directed to the vibratory mechanism of this invention.

What I claim is:

1. A vibratory mechanism comprising a casing, a pair of rolling elements carried within said casing, actuating means to arcuately propel said elements about said casing comprising a first drive means to abuttingly propel one element about said casing, a second and separate drive means to abuttingly propel the other element about said casing, and coacting angularly positioned members on each of said drive means including orientation means therebetween to secure said independent drive means together in a given selected operative angular relation with respect to each other to provide a predetermined and similarly spaced operative driving relationship between said pair of rolling elements within said casing, each of said drive means having portions thereof extended outwardly of said casing, said positioning and orientation means being positioned externally of said casing for connection with said outwardly extended portions of said first and second drive means.

2. A vibratory mechanism comprising a casing, a pair of rolling elements carried within said casing, actuating means to propel said elements about said casing comprising a first drive means to propel one element about said casing, a second drive means to propel the other element about said casing, and operable means to dispose both of said drive means in given selected fixed positions in the direction of their paths of movement with respect to each other to provide a predetermined spaced operative and in similarly fixed driving relationship between said pair of rolling elements within said casing, each of said drive means having portions thereof extended outwardly of said casing, said operable means being positioned externally of said casing for connection with the extended portions of said first and second drive means, and regulatory mechanism for said operable means to change the relative operative driving relations between said drive means to establish different operative rolling relationships between said pair of rolling elements within said casing.

3. A vibratory mechanism comprising a casing, a pair of rolling elements carried within said casing, actuating means to propel said elements about said casing comprising a first drive unit to propel one of said elements about said casing, a second drive unit to propel the other of said elements about said casing, operable mechanism to actuate both of said drive units to move said elements, said operable mechanism comprising a shaft connected with said first drive unit, a shaft connected with said second drive unit, and adjustable means connecting said shafts to cause concerted rotation thereof and to selectively change the angular relation of one shaft with respect to the other shaft thus changing the respective positions of said drive units within said casing.

4. A vibratory mechanism comprising a casing, a rolling element disposed within said casing for movement thereabout, power drive means having a rotatable actuating unit operably carried within said casing to contact said element and to impel the latter about the casing, said actuating unit comprising a single centrifugally balanced and rigid double arm member, counterbalancing wheels at opposite ends of said rigid arm member, with at least one of said wheels being adapted for active contact with said rolling element, and antifriction means interposed between each of said wheels and the adjacent portion of said arm member, one of said wheels being rendered active to drive said element in one direction about said casing, and the other of said wheels being rendered active to drive said same element in the opposite direction about said casing.

5. In a vibratory mechanism, a circular casing, a pair of chambers in said casing, a rolling element in each chamber, power drive means to propel said rolling elements in opposite directions within the chambers of said casing comprising a power shaft axially traversing said casing, a sleeve shaft on said power shaft to partially traverse said casing, reverse gear mechanism connecting said shafts to cause said sleeve shaft to rotate oppositely from said power shaft, and actuating mechanisms carried by each of said shafts within said casing chambers for operational contact with each of said rolling elements respectively to propel said elements in opposite directions within said casing.

6. In a vibratory mechanism, a circular casing, a pair of chambers in said casing, a rolling element in each chamber, power drive means to propel said rolling elements in opposite directions within the chambers of said casing comprising a power shaft axially traversing said casing, a sleeve shaft on said power shaft to partially traverse said casing, reverse gear mechanism connecting said shafts to cause said sleeve shaft to rotate oppositely from said power shaft, and actuating mechanisms carried by each of said shafts within said casing chambers for operational contact with each of said rolling elements respectively to propel said elements in opposite directions within said casing, said reverse gear mechanism comprising cooperative parts symmetrically arranged about the casing axis to provide a centrifugally balanced unit, and said actuating mechanisms each comprising an arm structure arranged symmetrically with respect to said casing axis for centrifugal balance and with one portion of said arm structure in driving contact with one of said rolling elements of the casing.

7. A vibratory mechanism comprising a casing, a pair of rolling elements carried within said casing, actuating means to propel said elements about said casing comprising a first drive means to propel one element about said casing, a second drive means to propel the other element about said casing, and orienting means to secure said drive means in a given selected operative relation with respect to each other to provide a predetermined spaced operative relationship between said pair of rolling elements within said casing, said orienting means comprising coacting members connected with each drive means respectively, and releasable locking mechanism for said coacting members to adjustably position said members in a given selected relation with respect to each other thereby functioning to orient said respective drive means accordingly.

8. A vibratory mechanism comprising a casing, a pair of rolling elements carried within said casing, actuating means to propel said elements about said casing comprising a first drive means to propel one element about said casing, a second drive means to propel the other element about said casing, and orienting means to secure said drive means in a given selected operative relation with respect to each other to provide a predetermined spaced operative relationship between said pair of rolling elements within said casing, said orienting means comprising coacting members connected with each drive means respectively, and releasable locking mechanism for said coacting members to adjustably position said members in a given selected relation with respect to each other thereby functioning to orient said respective drive means accordingly, and one of said coacting members comprising a driving structure for said actuating means.

9. In a rotationally actuated mechanism, a pair of annular trackways, a free rolling element on each of said trackways, and driving mechanism constructed and arranged to impel said rolling elements about said trackways comprising radially positioned impellers within said trackways for contact with each rolling element, said impellers being positioned in given angular positions with respect to each other to simultaneously drive said rolling elements in given annular spaced locations about said annular trackways, and regulatory mechanism connected with said impellers to selectively alter the angular relationships therebetween and to actuate said rolling elements about said annular trackways in differently spaced annular locations with respect to each other.

10. In a rotationally actuated mechanism, a pair of annular trackways, a free rolling element on each of said trackways, and driving mechanism constructed and arranged to impel said rolling elements about said trackways comprising radially positioned impellers within said trackways for contact with each rolling element, said impellers being positioned in given angular positions with respect to each other to simultaneously drive said rolling elements in given annular spaced locations about said annular trackways, and regulatory mechanism connected with said impellers to selectively alter the angular relationships therebetween and to actuate said rolling elements about said annular trackways in differently spaced annular locations with respect to each other, said regulatory mechanism including a driving unit to actuate said driving mechanism.

11. In a rotationally operable mechanism, trackways, a pair of rolling elements on said trackways, telescoped shafts encircled by said trackways, radially disposed arm units on said shafts to bodily actuate said rolling elements about said trackways, and releasable adjustable means to vary the angularity between said arm units for changing the annular spaced locations between said rolling elements on said trackways comprising apertured disc members on each shaft, and pin mechanism to connect said apertured disc members in given adjusted positions with respect to each other.

12. In a rotationally operable mechanism, trackways, a pair of rolling elements on said trackways, telescoped shafts encircled by said trackways, radially disposed arm units on said shafts to bodily actuate said rolling elements about said trackways, and releasable adjustable means to vary the angularity between said arm units for changing the annular spaced locations between said rolling elements on said trackways comprising apertured disc members on each shaft, and pin mechanism to connect said apertured disc members in given adjusted positions with respect to each other, and securing means to hold said pin mechanism in operative relation with respect to said disc members.

13. In a rotationally operable mechanism, trackways, a pair of rolling elements on said trackways, telescoped shafts encircled by said trackways, radially disposed arm units on said shafts to bodily actuate said rolling elements about said trackways, and releasable adjustable means to vary the angularity between said arm units for changing the annular spaced locations between said rolling elements on said trackways comprising apertured disc members on each shaft, and pin mechanism to connect said apertured disc members in given adjusted positions with respect to each other, one of said disc members comprising a drive wheel to actuate said arm units.

14. A vibratory mechanism comprising a casing, a pair of rolling elements carried within said casing, actuating means to propel said elements about said casing comprising a first drive unit to propel one of said elements about said casing, a second drive unit to propel the other of said elements about said casing, operable mechanism to actuate both of said drive units to move said elements, said operable mechanism comprising a shaft connected with said first drive unit, a shaft connected with said second drive unit, and adjustable means connecting said shafts to cause concerted rotation thereof and to selectively change the angular relation of one shaft with respect to the other shaft thus changing the respective positions of said drive units within said casing, said shafts each having sections thereof arranged to terminate externally of said casing, and said adjustable means being connected with said latter shaft sections and outside of said casing.

15. In a vibratory mechanism, a casing, a pair of chambers in said casing, an unattached rolling element loosely carried in each chamber, drive means to propel said rolling elements in opposite directions within the chambers of said casing comprising a first shaft axially traversing said casing, a sleeve shaft on said first shaft to partially traverse said casing, reverse gear mechanism connecting said shafts to cause said sleeve shaft to rotate oppositely from said first shaft, and actuating mechanisms carried by each of said shafts within said casing chambers for operational contact with each of said rolling elements respectively to propel said elements in opposite directions within said casing, said actuating mechanisms each comprising a balanced double arm unit symmetrically positioned with respect to each shaft axis and adapted to abuttingly contact the associated rolling element with one or the other of said arms as determined by the direction of rotation of said shafts.

16. In a vibratory mechanism, a casing, a pair of chambers in said casing, an unattached rolling element loosely carried in each chamber, drive means to propel said rolling elements in opposite directions within the chambers of said casing comprising a first shaft axially traversing said casing, a sleeve shaft on said first shaft to partially traverse said casing, reverse gear mechanism connecting said shafts to cause said sleeve shaft to rotate oppositely from said first shaft, and actuating mechanisms carried by each of said shafts within said casing chambers for operational contact with each of said rolling elements respectively to propel said elements in opposite directions within said casing, said actuating mechanisms each comprising a balanced double arm unit symmetrically positioned with respect to each shaft axis and adapted to abuttingly contact the associated rolling element with one or the other of said arms as determined by the direction of rotation of said shafts, and reversible power drive means connected with one of said shafts for driving said actuating mechanisms in either direction.

References Cited in the file of this patent
UNITED STATES PATENTS

| | | |
|---|---|---|
| 8,727 | Swett | Feb. 10, 1852 |
| 16,717 | Cowles | Mar. 3, 1857 |
| 415,941 | Frisbee | Nov. 26, 1889 |
| 565,176 | McGlew | Aug. 4, 1896 |
| 1,719,123 | Mitchell | July 2, 1929 |
| 2,127,317 | Welch | Aug. 16, 1938 |
| 2,200,806 | Piper | May 14, 1940 |
| 2,206,386 | Bernhard | July 2, 1940 |
| 2,248,182 | Mateer | July 8, 1941 |
| 2,366,033 | Johnstone | Dec. 26, 1944 |